United States Patent [19]
Schnurer et al.

[11] Patent Number: 5,842,002
[45] Date of Patent: Nov. 24, 1998

[54] COMPUTER VIRUS TRAP

[75] Inventors: John Schnurer, Yellow Springs, Ohio; Timothy J. Klemmer, Briarcliff Manor, N.Y.

[73] Assignee: Quantum Leap Innovations, Inc., Briarcliff Manor, N.Y.

[21] Appl. No.: 865,786

[22] Filed: May 30, 1997

Related U.S. Application Data

[63] Continuation of Ser. No. 754,120, Nov. 20, 1996, abandoned, which is a continuation of Ser. No. 607,520, Feb. 27, 1996, abandoned, which is a continuation of Ser. No. 252,622, Jun. 1, 1994, abandoned.

[51] Int. Cl.$^6$ ............................. G06F 9/455; G06F 11/00
[52] U.S. Cl. ............................................................ 395/500
[58] Field of Search .............................. 395/180, 183.14, 395/500; 371/16.21, 16.23

[56] References Cited

U.S. PATENT DOCUMENTS

| | | | |
|---|---|---|---|
| 5,121,345 | 6/1992 | Lentz . | |
| 5,144,660 | 9/1992 | Rose . | |
| 5,274,815 | 12/1993 | Trissel et al. | 395/700 |
| 5,278,901 | 1/1994 | Shiuh-Pyung . | |
| 5,379,414 | 1/1995 | Adams | 395/575 |
| 5,398,196 | 3/1995 | Chambers | 364/580 |
| 5,440,723 | 8/1995 | Arnold et al. | 395/181 |

FOREIGN PATENT DOCUMENTS

WO93/22723  11/1993  WIPO .

OTHER PUBLICATIONS

IBM Technical Disclosure Bulletin, vol. 34, No. 7A, 1 Dec. 1991, pp. 199–200, XP000255506 "Employment of Virus Detection Procedures at Domain Boundaries".

Testimony of Peter S. Tippett; *Computer Viruses & The Computer Ethics Void*, Hearings on Telecommunications, Data and Network Security; House Subcommittee on Telecommunications and Finance.

Mark Hopkins, *The Transputer Handbook*, INMOS Ltd.

Mark Hopkins, *The Transputer Databook*, INMOS Ltd.

*Primary Examiner*—Kevin J. Teska
*Assistant Examiner*—Ayni Mohamed

[57] ABSTRACT

A computer virus trapping device is described that detects and eliminates computer viruses before they can enter a computer system and wreck havoc on its files, peripherals, etc. The trapping device creates a virtual world that simulates the host computer system intended by the virus to infect. The environment is made as friendly as possible to fool a computer virus into thinking it is present on the host, its intended target system. Within this virtual world, the virus is encouraged to perform its intended activity. The invention is able to detect any disruptive behavior occurring within this simulated host computer system. It is further able to remove the virus from the data stream before it is delivered to the host and and/or take any action previously instructed by a user.

6 Claims, 8 Drawing Sheets

COMPUTER VIRUS TRAP

This is a continuation of application Ser. No. 08/754,120 filed on Nov. 20, 1996, now abandoned which in turn is a continuation of application Ser. No. 08/607,520 filed on Feb. 27, 1996, now abandoned, which in turn is a continuation of application Ser. No. 08/252,622 filed on Jun. 1, 1994, now abandoned.

BACKGROUND OF THE INVENTION

The computer virus problem that exists today had its beginnings sometime in the late 1980s. At that time computer viruses were a novelty and plagued mainly DOS and Macintosh computers. Today, almost every Fortune 500 company has experienced computer viruses with the current rate being about one virus incident every 2 to 3 months.

The term computer virus is applied in common and legal usage to software, code, code blocks, code elements and code segments which perform certain functions in the digital computer environment. Code is intended to mean the digital instructions which the computer responds to. Non damaging or legitimate software, code, code blocks, code segments and code elements that serve a useful purpose would not be considered a virus.

Computer viruses have been known to cause physical harm to computer hardware in addition to erasing and destroying data. While rare, there have been cases of viruses that have made calls to disk drive heads actually scoring the media; still others have been discovered that ramped up the scan rate on a monitor causing failure. Most viruses do not, however, intentionally cause explicit physical harm and they are discovered before they are triggered to cause damage to data and files. However, it is after discovery that the real cost of viruses becomes apparent in connection with their detection and removal. In an average computer site this might entail searching 1000 PCs and 35,000 diskettes. If the software engineer misses even one instance of the virus, other computers will be reinfected and the clean up search must be repeated all over again.

A common misconception is that there are good viruses and bad viruses. Some viruses are claimed to be benign because they do not have a malicious trigger event and cannot do intentional harm. However, this misses the point that the problems computer viruses cause are mainly due to the trigger events. It is a fact that computer viruses replicate. This by itself is harmful because it necessitates a search to clean up all instances of the viruses in a computer installation.

The damage caused by viruses, not so much due to erased files or data, but in the cost of detection, removal and also the accompanying lowered worker productivity can be very high. It has been calculated that the average computer site will spend on the order of about $250,000 on a computer virus cleanup. It has been estimated that computer viruses will cost U.S. computer users over a billion dollars in 1994 alone.

The problem will grow exponentially due to the advent of the Information Super Highway. The increased connectivity among individuals, companies and government will allow a computer virus to create havoc. Currently disjoint computer systems that perform various functions that we take for granted today, such as, banking, telecommunications, radio, information databases, libraries and credit might meld together in the future. Thus, computer viruses, unchecked, could have a crippling effect on our society.

A virus can only cause trouble when it enters a system and finds a location on which to act. In a general sense, the virus must perform an intended function or a function the user or operator did not intend, expect, compensate for or otherwise protect against. Some examples of malicious virus activity are: changing names of files making it difficult for the user to access the files, moving a file to a new location, deleting files, interfering with working programs (i.e. causing all the words on a screen to fall to the bottom of the screen in a heap), replicating themselves and clogging up the system making it nonfunctional or waiting for a predetermined time period or after a certain number of toggle operations such as boot, access, cursor movements, mouse clicks, etc. before acting.

More felonious type viruses are those that have been released to cause ruin or impairment of a system for the purposes of sabotage, espionage, financial gain or to impair a competing business. Some examples include: creating a trap door which allows access to an unauthorized user for any purpose such as espionage, dumping files or erasure, navigation programs which find routes into systems, password cracking programs, modifying the executable segment of legitimate programs and attaching themselves to a code block and travel to another site.

In addition to traditional PCs and networks being vulnerable to virus infections, embedded control systems often used in industrial process control settings are also vulnerable. These systems control machinery, motors, industrial robots and process data from sensors. Because embedded systems are vulnerable to viruses just as PCs are, the results are potentially quite damaging. The smooth flow of a factory or assembly line could be devastated by a virus' uncontrolled behavior.

There are many possible ways for a virus to act on a computer system. All computers go through a boot procedure in which the Basic Input Output System (BIOS) and/or other resident system tools perform a variety of startup tasks such as, finding drives, testing memory and the system, initiating system files, loading DOS or other Operating System (OS) and bringing up an initial startup program. The system performs certain housekeeping tasks such as establishing various links among other functions. A computer system of any utility is complex enough that someone writing a virus has a myriad of opportunities and possibilities in which to cause trouble and interfere with the proper operation of the system.

The most common solution to the virus problem is to employ anti-virus software that scans, detects and eliminates viruses from computer systems. These programs work by searching a storage medium such as a hard disk drive or floppy diskette for known patterns of various viruses. However, there are problems associated with this method of virus elimination. The software can only scan for known viruses which have an identifiable pattern that can be detected using repetitive string searches. To protect against new viruses frequent upgrades must be distributed. In addition, for the program to detect a virus it must already have infected that computer. The virus might have done some damage or even replicated itself and spread before it is detected. Also, the program must be run often to provide effective protection against viruses especially on systems where programs and data are transferred frequently between computers via diskettes.

In addition further liabilities, pratfalls and limitations to the current breed of antivirus software solutions exist. This software breaks down into 3 categories: scanners, monitors, CRC's. Scanners as previously mentioned work off of databases of known strings. These databases are in constant need of updates. Monitors are memory resident programs monitoring the computer for questionable behavior. Monitors suffer from high rates of false positives, and they occupy and take a large portion of the limited conventional memory of a PC. CRC's are error checking programs that generate a unique "signature" in the form of a 2-byte number for each and every file to be protected. CRC programs either place the "signature" in the file itself or in a separate file. CRC programs suffer from the fact that they are easy to identify and thus easily tricked into recreating a "signature" for an infected file. Further, Scanners & Monitors & CRC programs must be run on the PC in question. Often this is a time consuming chore. These programs usually must have full control of the PC to operate further inconveniencing the user because he must wait for the scanner to finish before he can begin his normal work. The other critical concept is that the anti-virus software is run on the PC in question. It is subject to the limitations and liabilities of the operating system and may already be running on an infected PC without knowing it. The invention takes a unique approach by performing its logic outside of the PC, not inconveniencing the user and is more effective because the invention's hardware guarantees a clean uninfected start.

Another possible solution is to increase computer security to the point where viruses cannot enter the system. Login/password control and encryption do not effect computer viruses. With encryption, detection and elimination is made more difficult because the virus along with good data is encrypted, only becoming decrypted when it attempts to replicate. Clearly, this is quite burdensome and expensive to implement.

Another possible solution is to avoid computer bulletin boards, both the commercial type such as, Compuserve, Prodigy, the Internet and Usenet, and the private, local, small type. However, this will not prevent viruses from spreading because most viruses do not result from software or data downloaded from information databases or computer bulletin boards. The operators of both commercial on-line services and private bulletin boards are very careful to keep viruses off their systems. They are constantly searching and scanning anything that is uploaded to their systems before making it available to their subscribers. In addition, most computer viruses of the boot track type do not spread through download data or software. The majority of viruses are spread through diskettes. There are known instances of commercial software being distributed after being infected by a virus. There are known instances of viruses being distributed unwittingly by diskette manufacturers on blank diskettes. There are no rules for which diskettes are more likely to be free from viruses.

Thus, there is a long felt need for a device that can search for, detect and eliminate viruses before they ever enter into a computer system that is transparent to a user and effective against all viruses in existence today and those not yet created.

SUMMARY OF THE INVENTION

One characteristic of almost all viruses is that on their own they are not capable of crossing from one computer OS to another. This is because different computer systems in use today have different internal instructions or command sets. The language perfectly acceptable and intelligible to one OS does not have any correlation to another. An analogy to humans would be two people speaking different languages not being able to communicate. Although there might exist identical words present in both languages it is statistically very unlikely for a misinterpreted or cross over string of words or set of computer instructions (i.e. a virus) to convey a significant amount of information or be able to effectively execute a series of instructions. It is even more unlikely for this misinterpreted or cross over string of words or series of instructions to migrate from one language or system to another language or system and still be able to convey any useful information or execute a series of commands.

The present invention utilizes this characteristic of viruses to create an impenetrable barrier through which a virus cannot escape. The use of a foreign operating system guarantees the invention a high degree of safety and impenetrability. While the inventors recognize that such invention can be built without the use of a foreign operating system, such a version of the invention would lack any creditable degree of security. In addition, without the use of a foreign operating system the invention itself risks contamination. A foreign operating system different from the one being protected is introduced into the data stream before the data arrives at the computer system to be protected. To illustrate: if a program written for DOS will not run as intended on a Macintosh neither will a virus. A foreign operating system in order to complete its operation must provide an emulation of the target computer operating system (disk drives, memory configuration, ports, etc.) The virus is therefor fooled into thinking it is resident on the target computer system it was intending to infect. It is here, while the virus is resident within the emulated target operating system, that the virus is encouraged to infect files, destroy data and wreak havoc. It is here that the invention diverges from all other strategies in virus-detection and prevention. All other strategies are defensive in nature: they mark files to detect unwarranted changes, they scan for unintended behavior in an attempt to prevent the virus from performing its damage. The present invention takes an offensive strategy by encouraging the virus to infect and destroy files.

The most critical behavior of a virus that computer users to prevent is the virus' ability to replicate. Once a virus has erased a file, made a hard drive inoperable, it is detected. Once the virus has done anything considered malicious, it usually is detected. At this point anti-virus software and hardware must be brought in and run to detect and clean files. Prior to its performing this malicious act, a virus must replicate. If it does not replicate, it cannot grow and stay alive. If it has the ability to replicate, it can travel from PC to floppy to PC to network, etc. It is this behavior of viruses to replicate that the present invention preys on. The virus is encouraged to act within this cross platform generated emulation so that it can be detected. It is this use of cross platform technology and offensive strategy that allows a virus to be detected at any level before any damage occurs to the protected system. It is in the emulation that the invention can detect the virus and in the use of transplatform logic/environment that it can safely contain the virus. Where the virus can get around DOS or MAC scanners or Operating System or BIOS, it cannot infiltrate and contaminate the foreign operating system.

A foreign operating system is chosen based on its ability to monitor and watch any emulations, and for being able to manipulate elements within the emulation (files, falsifying BIOS information, creating sham peripherals), and for the sheer speed and computational horsepower.

The inventors recognize that it can be done without a transplatform, but it will be slow and absolutely unsafe. The use of a foreign operating system can be likened to the use of lead walls and glass walls and mechanical arms used by people manipulating radioactive materials in labs. While it is certainly possible to pick up radioactivity with one's bare hands, it is not highly recommended or is it safe. While the invention can be had without the use of a foreign operating system, it is not highly recommended nor is it safe.

A primary object of the present invention is to provide a virus detection system to detect and eliminate viruses at their most basic level by simulating the host's environment by creating a virtual world to fool the virus into thinking it is resident on the host so as to allow disruptive behavior to be detected and the virus destroyed without harm to the host.

Another object of the present invention is to provide a virus detection system able to detect and trap viruses at any level using in a way other than performing string searches through memory or files to detect viruses.

Yet another object of the present invention is to provide a virus detection system able to detect as of yet unknown viruses thereby obviating the need for software updates to keep the detection device current.

Still another object of the present invention is to minimize the down time of the host computer system in the event a virus is detected.

Still another object of the invention is to record at the user's discretion-the virus to another media for transferal to virus analysis groups. The object is to feed the virus to an internal analysis to compare against a know, previously acquired attempt, such as a trapdoor or file change, or industrial espionage or sabotage code, etc.

Still another object is to record from which incoming source the virus came, i.e., modem, which digiboard channel, internet, Compuserve, LAN station/Userid, WAN line, etc.

Another object is to alert system administration of the attack.

BRIEF DESCRIPTION OF THE DRAWINGS

Serving to illustrate exemplary embodiments of the invention are the drawings of which.

DETAILED DESCRIPTION OF THE INVENTION

In order to afford a complete understanding of the invention and an appreciation of its advantages, a description of a preferred embodiment of the present invention in a typical operating environment is presented below.

Operating on the principle that a virus cannot cross operating systems, the present invention creates a virtual world for a potential virus. An OS that emulates the system to be protected provides a friendly familiar environment for the virus. The virus is encouraged to act in this virtual world created for it. The results of the virus' disruptive behavior can be detected and consequently the virus can be flagged and eliminated or stored and further analyzed. This scheme is based on the assumptions that almost all viruses are executable in nature, no user would try to purposely communicate a destructive virus to another and that it is possible to identify executable instructions in an environment where the instruction cannot possibly operate.

Figure 1:
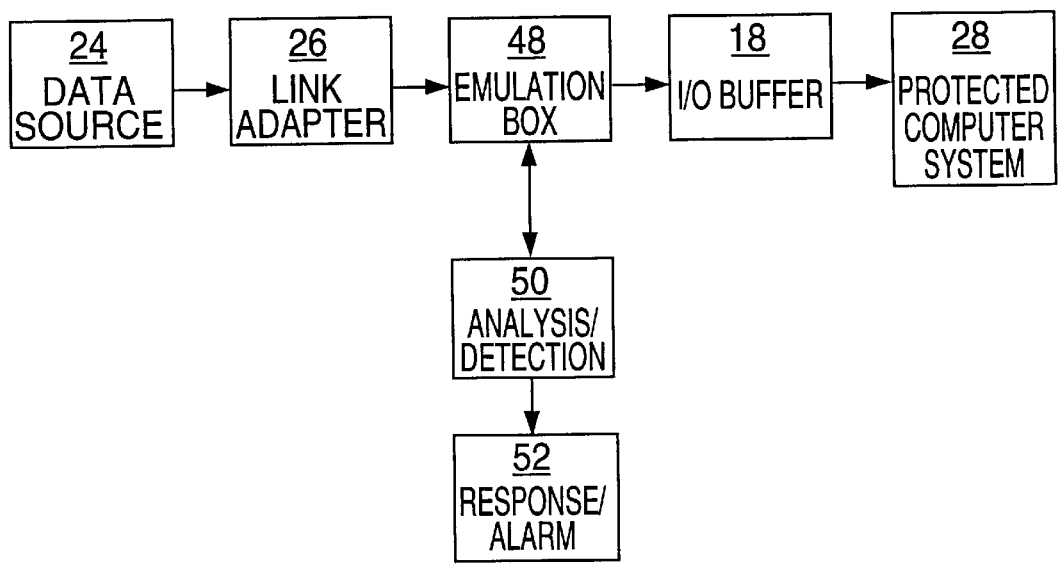
FIG. 1 is a high level functional block diagram of the preferred embodiment of the present invention.
Figure 2:
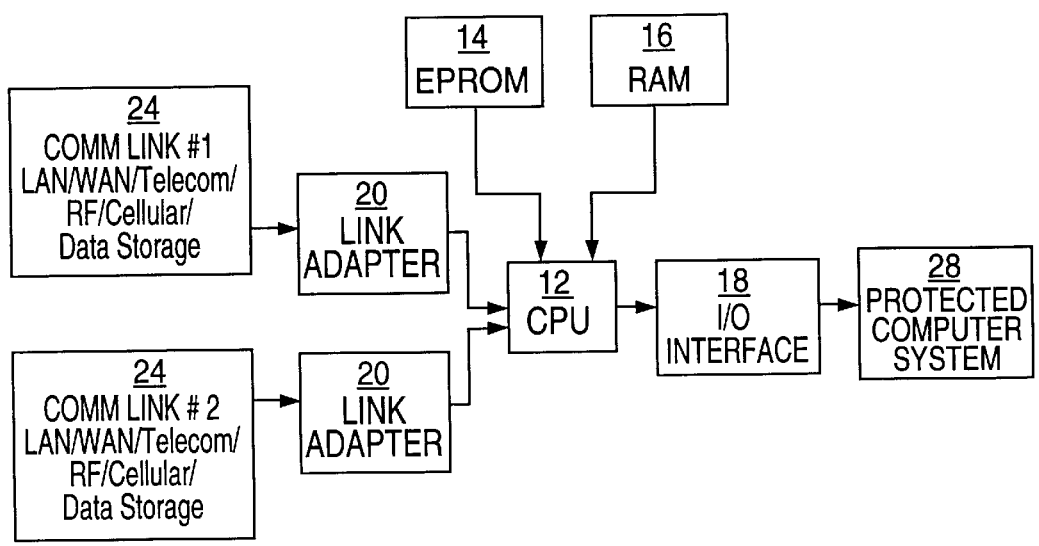
FIG. 2 is a functional block diagram of the preferred embodiment of the present invention.

Shown in FIGS. 1 and 2 are functional block diagrams of the virus trapping device 10. The Central Processing Unit (CPU) 12 can be any computing device (i.e. Intel, Motorola, Paramid, National Semincondutor or Texas Instruments microprocessor, multiple chip set CPUs, board level CPUs, etc.). The Transputer is particularly well suited because almost all PCs in use today employ CPUs other than the Transputer. A guide to the application and programming of the Transputer can be found in The Transputer Handbook, by Mark Hopkins, copyright 1989 INMOS Ltd. and The Transputer Databook, by Mark Hopkins, 3rd Edition copyright 1992 INMOS Ltd. Italy. As a typical microprocessor circuit design, EPROM 14 holds the operating software for the CPU 12. RAM 16 provides a temporary storage facility for the CPU 12 to execute the virus detection software. Link adapters 20 provide physical connections to interface the virus trapping device 10 to the outside world. The trap device 10 is not limited to two link adapters, any number could be implemented to handle a multitude of input data streams. The device 10 reads an incoming data stream from one or more outside sources. An example of a communication link 24 are a Local Area Network (LAN) (i.e. Novell), Wide Area Network (WAN) (i.e. networked LANs), the telephone network (i.e. Modems), radio frequency (RF) type cellular network or some type of data storage device (i.e. floppy diskette, hard disk, tape, CD-ROM, magneto-optical, etc.). The communication link 24 provides an incoming data stream for the device 10 to operate on. Diskettes are commonly used to transfer data and programs from one computer to another, thus making it a common entry point into the system for viruses. An input/output (I/0) interface 18 provides a means for the virus trapping device 10 to communicate with the computer system being protected 28.

Figure 3:
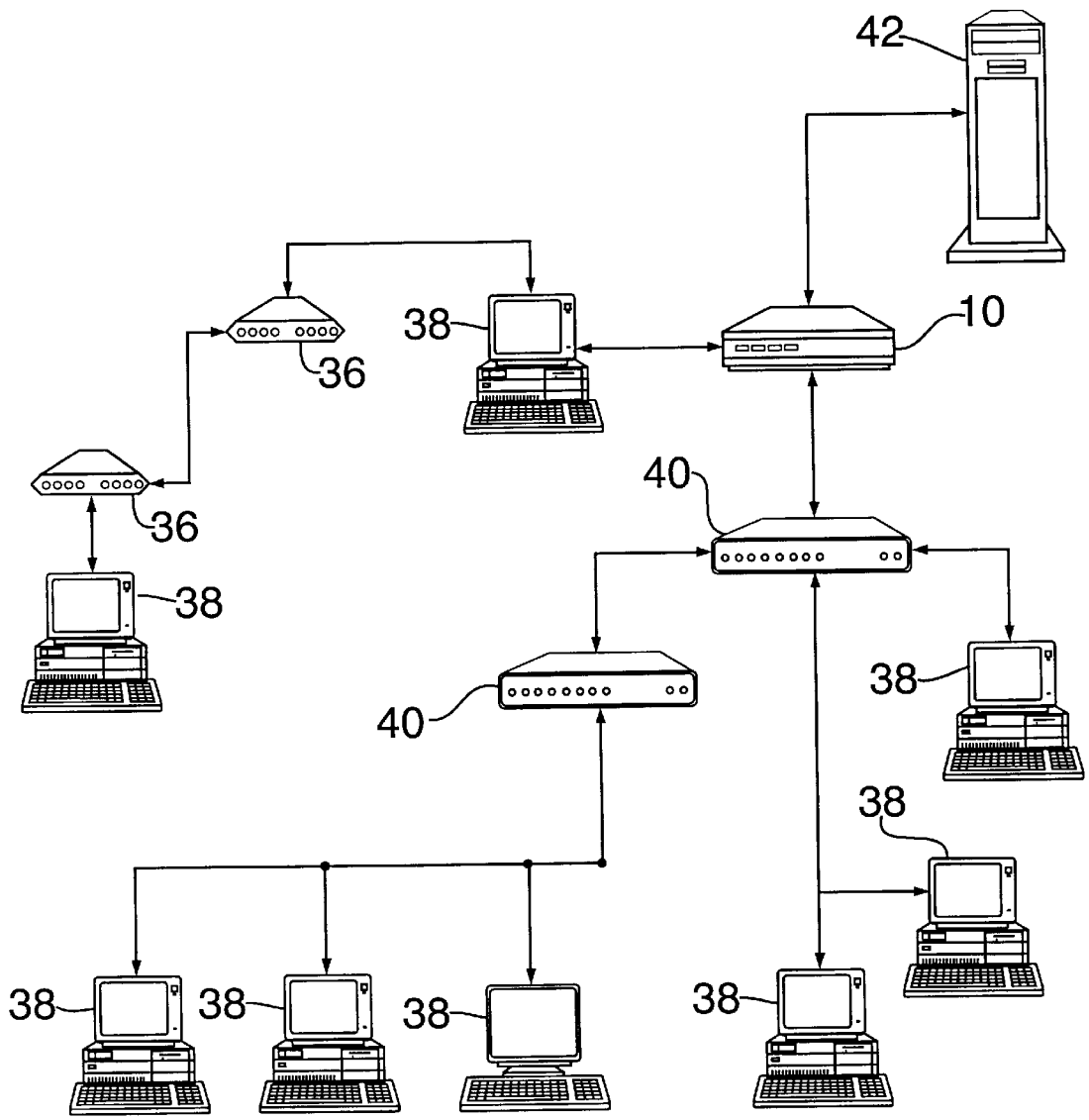
FIG. 3 is a functional block diagram showing the application of the present invention in a local area networking environment.

The application of the virus trapping device 10 in a typical operating environment is shown in FIG. 3. The file server 42 is the computer system to be protected. The virus trapping device 10 is placed in the data stream that connects the filer server 42 to other workstations 38. The hubs 40 serve to connect the workstations 38 into a LAN and the modems 36 serve to connect remote workstations 38 to the file server 42. In this scenario, all traffic to and from the file server 42 is monitored for viruses by the trap 10.

Figure 4:
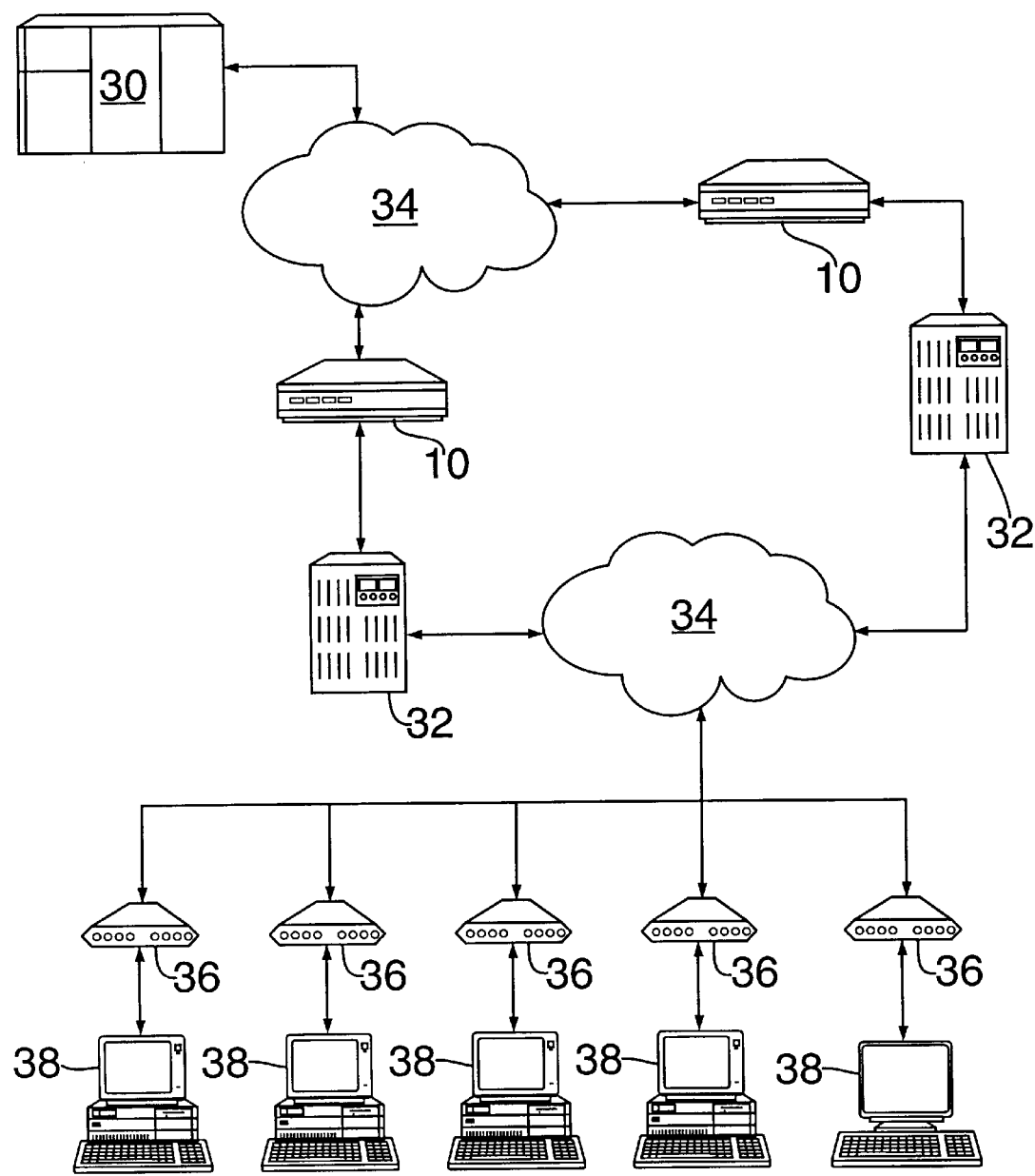
FIG. 4 is a functional block diagram showing the application of the present invention in a telecommunications networking environment.

Another application of the trapping device 10 is shown in FIG. 4. In this scenario, data traffic passing through the telecommunications network 34 is protected from viruses. A user might have a mainframe file server 30 at a remote site connected to the telephone network 34. Nodes 32 located in the telephone company's central offices perform access and cross connect functions for customers' data traffic. To prevent the spread of a virus through the network, the trapping device 10 is placed in front of each node 32. Data traffic between workstations 38 connected to the telephone network 34 via modems 36 and the mainframe file server 30 is constantly checked for viruses because the traffic must pass through the virus trapping device 10.

Operation of the virus trapping device 10 is as follows. The trapping device 10 monitors the data stream that enters from the outside world, such as from the communications link 24. All data is treated as data whether it is actually data (i.e. data files) or instructions (i.e. executables) as it passes over the link 24. At this point the actual instructions have not been executed but rather they are in the process of being transmitted for execution. While in this state of transmission, emulation means 48, controlled by the CPU 12, provide a friendly environment for a potential virus. The data is put into the emulation chamber 48 where the virus is fooled into acting as if it were really present on the host system. It is desired that any disruptive behavior the virus is capable of displaying take place in emulation chamber 48 such as replicating, attacking another program or destroying data. In this virtual world the virus has complete access to its environment. It is at this point that analysis and detection means 50 controlled by the CPU 12 catches the virus in the act of self replication and prevents it from infecting the host system. The virus cannot escape the emulation box 48 because the box exists in a foreign operating environment with no access to critical files, keyboard, screen, etc. Access to the real world is completely blocked.

Upon startup of the trapping device 10, the emulation software is read from EPROM 14 and executed. When a user turns on his workstation 38, a connection is established between the workstation 38 and the file server 30 (or 42). A connection session is created in the RAM 16 of the CPU 12. In like fashion, a session is created for each user.

As the user at a workstation 38 runs commands and moves file about, data is ultimately written to and read from the file server 30. The trapping device 10 splits the data into two paths. One path connects directly to the protected computer system 28 without modification. Data over the other path is written into the emulation box or virtual world created for each user. The write is performed in this box just as it would have been performed on the file server 30, protected computer 28 or workstation 38. Changes in data and time are simulated to trigger time sensitive viruses, fooling then as to the actual data and time. If the environment changes, it is checked to determine whether simply data was written or whether executable code was written.

Once the executable in inside the emulation box, a Cyclic Redundancy Check (CRC) is made of the Interrupt Request table (IRQ). Also, CRCs are generated on all files that are placed in the emulation box. The CRC is an error detection and correction code widely used in the computer and engineering fields. Other aspects of the environment, such as available memory, are saved too. All information saved is stored outside of the emulation box where it cannot be altered by a virus. The executable is forced to run.

If absolutely nothing happens, a self replicating virus does not exist. If anything within the environment changes (i.e. size of files, sudden attempts to write to other executables in the emulation box, etc.) it is determined that a virus does exist and is attempting to self replicate itself The first step is to determine whether the IRQ table was modified. The second step is to determine if another program was written to. Many programs attach themselves to IRQs (i.e. network shell programs, mouse drivers, some print drivers, communication and fax drivers). However, none of these programs will try to write code to other executables. No legitimate program will attempt direct changes to the File Allocation Table (FAT) or other internal OS disk area. They typically pass their changes (or writes) through standard well behaved DOS interrupts (INTs) (i.e. INT 21). Or, for example, in the case of file repair programs (i.e. Norton Utilities) which do at times write directly to the FAT, they will also not grab IRQs. It is the combination of grabbing one or more IRQs and attempting changes to either the FAT or executables that allows virus activity to be detected.

In the architecture of the IBM PC, for example, IRQs are prioritized and have different dedicated purposes. IRQ 0 is the system clock, IRQ 1 is the keyboard, etc. Almost no program needs to grab IRQ 0 having the highest priority, however a virus must. A virus must grab the highest priority IRQ because if it had a lower IRQ, then a conventional anti-virus program can get in at a higher priority and make the virus more vulnerable to detection. Many viruses grab several IRQs, allowing a virus to be detected by its 'signature'. In addition, most programs except viruses return to DOS about 95% or more of the memory they used for execution upon exiting or receiving an unload instruction. Therefore the following activities, monitored in the virtual environment created in the emulation box, can be used to detect viruses: attachment to IRQs, which IRQs have been attached, whether multiple IRQs have been attached, changes to the FAT, changes to executables, changes to the environment, changes to memory and any Terminate and Stay Resident (TSR) activity after the unload command has been issued and the program should have terminated.

In addition a further series of checks can then be initiated: check the "hard drive" and look for additional sectors or blocks being marked "bad" which were good before or vice versa. Has the program attached itself to the internal clock and is it incrementing its own internal clock? Have any of the error-checking algorithm results changed?

Figure 6A:
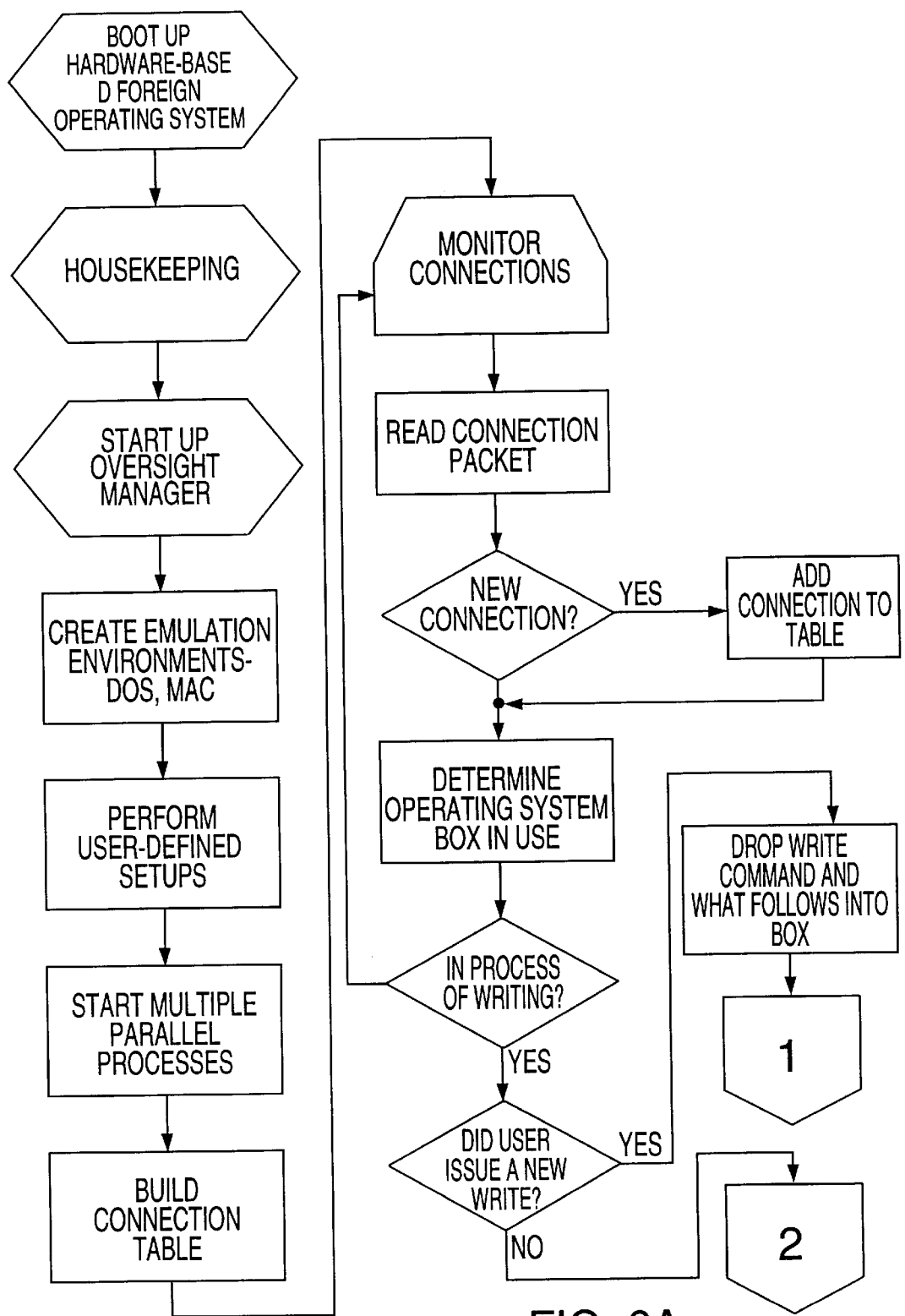
FIGS. 6A to 6C together comprise a high level flow chart of the operating steps of the present invention.
Figure 6B:
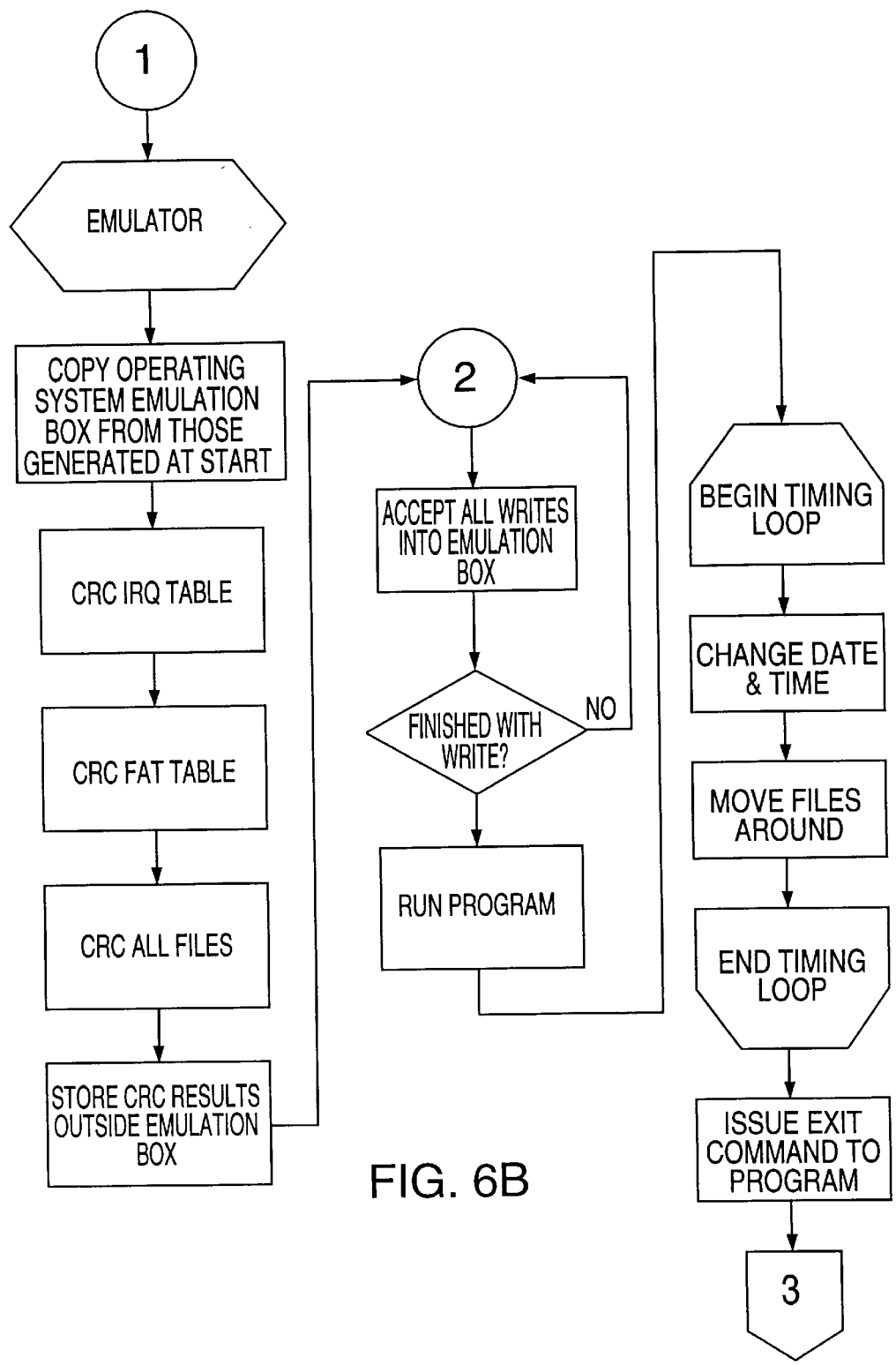
Figure 6C:
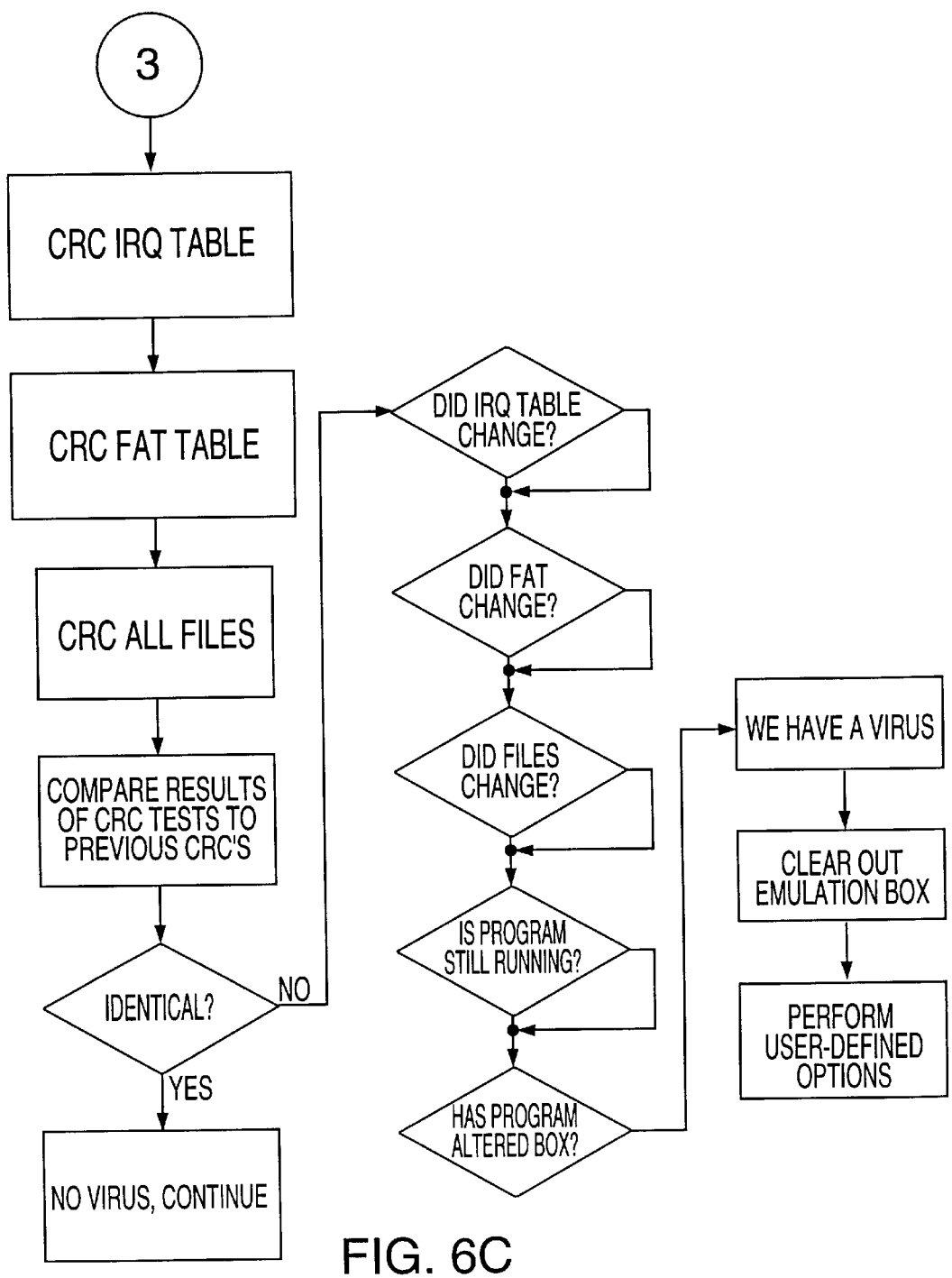

Upon detection of a virus by the analysis and detection means 50, response/alarm means 52 can execute any number of user definable optional commands such as messaging or beeping a system administrator, notifying the sender and receiver of the file or program, deleting the file, writing to a specially prepared floppy drive, calling a pager with a virus message or shutting down a network segment. A logic flow diagram showing the operating steps the trap device 10 performs is shown in FIGS. 6A to 6C.

Figure 5:
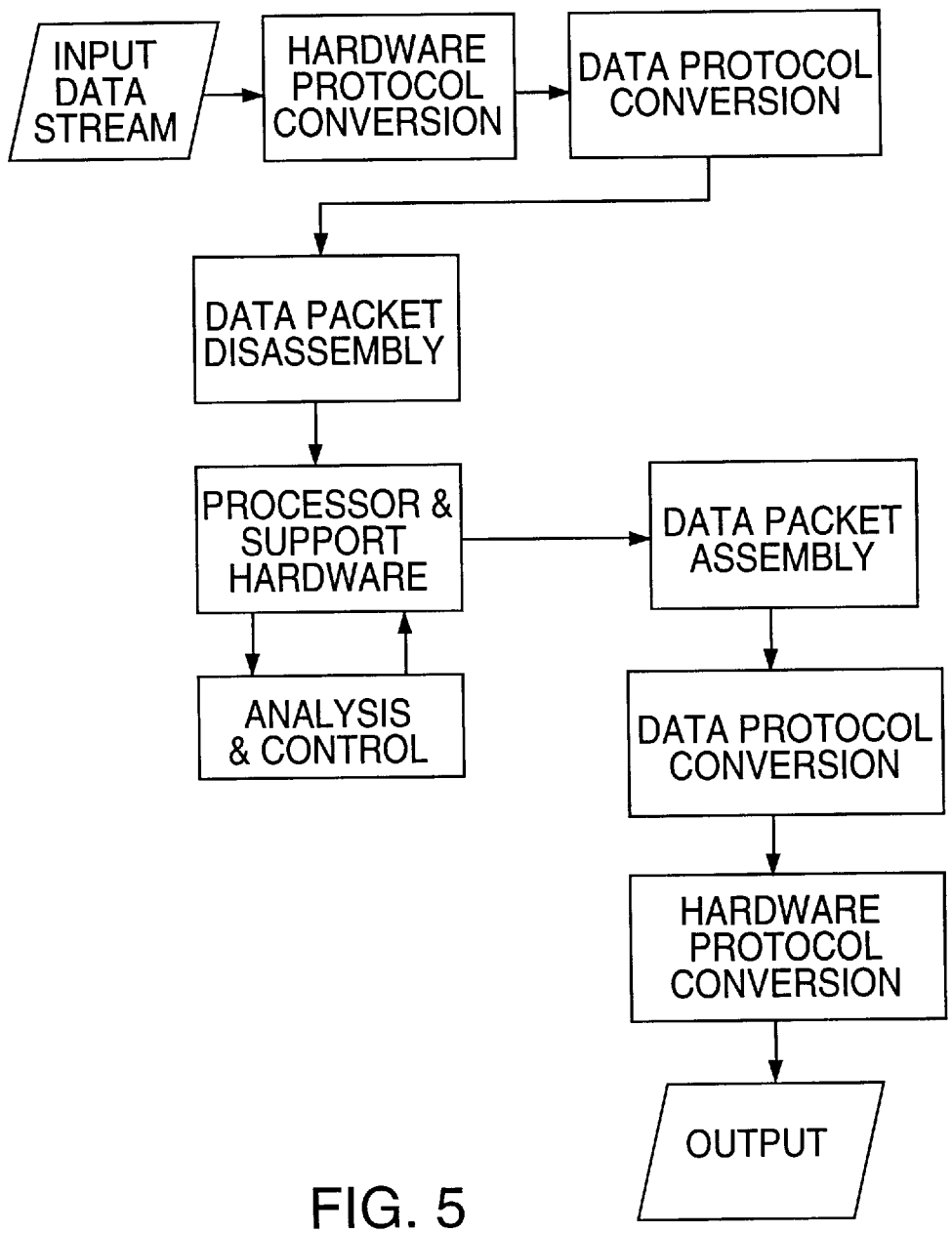
FIG. 5 is a high level software logic diagram showing the operating steps of the present invention.

A high level logic diagram of the software is shown in FIG. 5. The input data stream is generated by communication links 24. Link adapters 20 convert the data input stream from a hardware and software protocol specific to the particular communication link (i.e. X.25, Novell IPX/SPX, Microsoft NetBEUI, etc.) to a common protocol understandable by the CPU 12. After protocol conversion, the data packets are disassembled into a data stream having a common data format the CPU 12 is able to understand. The data is then processed and analyzed for the presence of virus activity. Following processing, data packets are re-assembled and converted to its original hardware and software protocol by the I/O Interface 18 before being output to the protected computer system 28.

The trap device 10 passes data directly through to the host system in addition to simultaneously processing it. This is to reduce the processing delays associated with sending large data files to the host system and having the trap device 10 process this data before the host receives it. The entire contents of a large file except for the final write command or the file close command is transmitted to the host. If no virus is detected, the write or close command is issued. If a virus is detected, the write or close is never issued and the response/alarm means 52 takes appropriate action.

It is clear that the above description of the preferred embodiment in no way limits the scope of the present invention which is defined by the following claims.

What is claimed is:

1. A computer virus trapping device comprising:

link adapter means connected to a source of data input for converting external protocols into a data stream understood by said trapping device;

emulation means connected to said link adapter means for accepting said data stream from said link adapter means; said emulation means including means for providing an environment isolated from a protected computer system and for simulating the architecture of said protected computer system whereby a computer virus is coaxed into performing its intended activity; and detection means responsive to said emulation means for looking for consequences of the intended viral activity upon completion of the simulation by said emulation means.

2. The device of claim 1, whereby said emulation means comprises processing means suitably programmed to create a virtual world for said computer virus that simulates said protected computer system.

3. The device of claim 2, whereby said processing means comprises a microcomputer circuit, temporary and permanent data storage and an I/O interface.

4. A computer virus trapping device comprising:

link adapter means connected to a source of data input for converting external protocols into a data stream understood by said trapping device;

emulation means connected to said link adapter means for accepting said data stream from said link adapter means; said emulation means including means for providing an environment isolated from a protected computer system and for simulating the architecture of said protected computer system whereby a computer virus is coaxed into performing its intended activity;

detection means responsive to said emulation means for looking for consequences of the intended viral activity upon completion of the simulation by said emulation means; and response means responsive to said detection means for taking action according to preset user instructions upon said detection means determining said computer virus exists.

5. A computer virus trapping device comprising:

link adapter means connected to a source of data input for bidirectionally converting external protocols into a converted data stream understood by said trapping device;

emulation means connected to said link adapter means for accepting said data stream from said link adapter means; said emulation means including means for providing an environment isolated from a protected computer system and for simulating the architecture of said protected computer system whereby a computer virus is coaxed into performing its intended activity;

detection means responsive to said emulation means for looking for consequences of the intended viral activity upon completion of the simulation by said emulation means;

response means responsive to said detection means for taking action according to preset user instructions upon said detection means determining said computer virus exists; and I/O buffer means responsive to said emulation means for reassembling said converted data back into said external data stream protocol and delivering said data stream to said protected computer system.

6. The device of claim 5, whereby said emulation means comprises microprocessor means programmed to stimulate the environment of said protected computer system.

* * * * *